United States Patent
Kanani et al.

(10) Patent No.: US 10,410,139 B2
(45) Date of Patent: Sep. 10, 2019

(54) NAMED ENTITY RECOGNITION AND ENTITY LINKING JOINT TRAINING

(71) Applicant: ORACLE INTERNATIONAL CORPORATION, Redwood Shores, CA (US)

(72) Inventors: Pallika Haridas Kanani, Westford, MA (US); Michael Louis Wick, Medford, MA (US); Katherine Silverstein, Amherst, MA (US)

(73) Assignee: Oracle International Corporation, Redwood Shores, CA (US)

( * ) Notice: Subject to any disclaimer, the term of this patent is extended or adjusted under 35 U.S.C. 154(b) by 602 days.

(21) Appl. No.: 15/168,309

(22) Filed: May 31, 2016

(65) Prior Publication Data

US 2017/0193396 A1 Jul. 6, 2017

Related U.S. Application Data

(60) Provisional application No. 62/275,112, filed on Jan. 5, 2016.

(51) Int. Cl.
| | |
|---|---|
| *G06F 15/18* | (2006.01) |
| *G06N 20/00* | (2019.01) |
| *G06N 7/00* | (2006.01) |
| *G06F 16/93* | (2019.01) |
| *G06F 16/248* | (2019.01) |
| *G06F 17/27* | (2006.01) |

(52) U.S. Cl.
CPC .......... *G06N 20/00* (2019.01); *G06F 16/248* (2019.01); *G06F 16/93* (2019.01); *G06F 17/278* (2013.01); *G06N 7/005* (2013.01)

(58) Field of Classification Search
CPC ........ G06N 20/00–20; G06N 7/00–005; G06F 17/278
USPC ................................................ 706/12, 45–61
See application file for complete search history.

(56) References Cited

U.S. PATENT DOCUMENTS

| | | | |
|---|---|---|---|
| 9,009,134 B2 | 4/2015 | Xu et al. | |
| 2009/0249182 A1 | 10/2009 | Symington et al. | |
| 2010/0094831 A1 | 4/2010 | Hurst | |
| 2016/0042058 A1* | 2/2016 | Nguyen | G06F 17/30684 707/771 |

OTHER PUBLICATIONS

Stern et al. "A Joint Named Entitye Recognition and Entity Linking System", 2012, Proceedings of the Workshop on Innovative Hybrid Approaches to Processing of Textual Data (Hybrid 2012), pp. 52-60.*

(Continued)

*Primary Examiner* — Jue Louie
(74) *Attorney, Agent, or Firm* — Potomac Law Group, PLLC

(57) ABSTRACT

A system that performs natural language processing receives a text corpus that includes a plurality of documents and receives a knowledge base. The system generates a set of document n-grams from the text corpus and considers all n-grams as candidate mentions. The system, for each candidate mention, queries the knowledge base and in response retrieves results. From the results retrieved by the queries, the system generates a search space and generates a joint model from the search space.

20 Claims, 3 Drawing Sheets

(56) References Cited

OTHER PUBLICATIONS

Durrett et al. "A Joint Model for Entity Analysis: Coreference, Typing, and Linking", 2014, Transactions of the Association for Computational Linguistics, vol. 2, pp. 477-490.*

Ji et al. Overview of TAC-KBP2014 Entity Discovery and Linking Tasks, 2014, Text Analysis conference (TAC 2014).*

Ikuya Yamada et al.; "Enhancing Named Entity Recognition in Twitter Messages Using Entity Linking"; Proceedings of the ACL 2015 Workshp on Noisy User-generated Text; pp. 136-140; Beijing, China; Jul. 31, 2015.

Stephen Guo et al.; "To Link or Not to Link? A Study on End-to-End Tweet Entity Linking"; Proceedings of NAACL-HLT 2013; pp. 1020-1030; Atlanta, Georgia; Jun. 9-14, 2013.

Avirup Sil et al.; "Re-ranking for Joint Named-Entity Recognition and Linking"; CIKM'13 Proceedings of the 22nd ACM International Conference on Information & Knowledge Management; pp. 2369-2374; ACM New York, New York; Oct. 27-Nov. 1, 2013; ACM 978-1-4503-2263—Aug. 13, 2010; http://dx.doi.org/10.1145/2505515.2505601.

Gang Luo et al.; "Joint Named Entity Recognition and Disambiguation"; Proceedings of the 2015 Conference on Empirical Methods in Natural Language Processing, pp. 879-888; Lisbon, Portugal, Sep. 17-21, 2015.

* cited by examiner

NAMED ENTITY RECOGNITION AND ENTITY LINKING JOINT TRAINING

CROSS REFERENCE TO RELATED APPLICATIONS

This application claims priority of Provisional Patent Application Ser. No. 62/275,112, filed on Jan. 5, 2016, the contents of which is hereby incorporated by reference.

FIELD

One embodiment is directed generally to a computerized text analysis, and in particular to the identification of entities in computerized text.

BACKGROUND INFORMATION

Named entity recognition ("NER") is the task of choosing token segments from raw text that refer to proper noun phrases. Often, this is grouped together with the task of mapping each proper noun phrase to a type ontology such as {person, location, organization} (or PER, LOC, ORG). Related to NER is the task of mapping proper noun phrases into an external knowledge base ("KB") such as Wikipedia or Freebase. This task is referred to as entity linking ("EL").

Both tasks are important for high-level natural language processing tasks such as question answering, automatic knowledge base construction, relation extraction, and sentiment analysis. Traditionally, NER and EL have been treated as separate components in a pipeline. First, an NER tagger segments and classifies tokens in text. Then, an EL component tries to match token spans chosen by the NER tagger with entries in a KB.

SUMMARY

One embodiment is a system that performs natural language processing. The system receives a text corpus that includes a plurality of documents and receives a knowledge base. The system generates a set of document n-grams from the text corpus and considers all n-grams as candidate mentions. The system, for each candidate mention, queries the knowledge base and in response retrieves results. From the results retrieved by the queries, the system generates a search space and generates a joint model from the search space.

DETAILED DESCRIPTION

One embodiment is a joint unified probabilistic model for using both named entity recognition ("NER") and entity linking ("EL") for high-level natural language processing tasks. Dependencies between the output variables of the NER and EL are used so that predictions from NER can influence predictions from EL, and vice versa, in the form of feedback. Embodiments model the two tasks (i.e., NER and EL), which are usually performed separately in isolation from each other, jointly, and include a learning and inference algorithm for this joint model.

Figure 1:
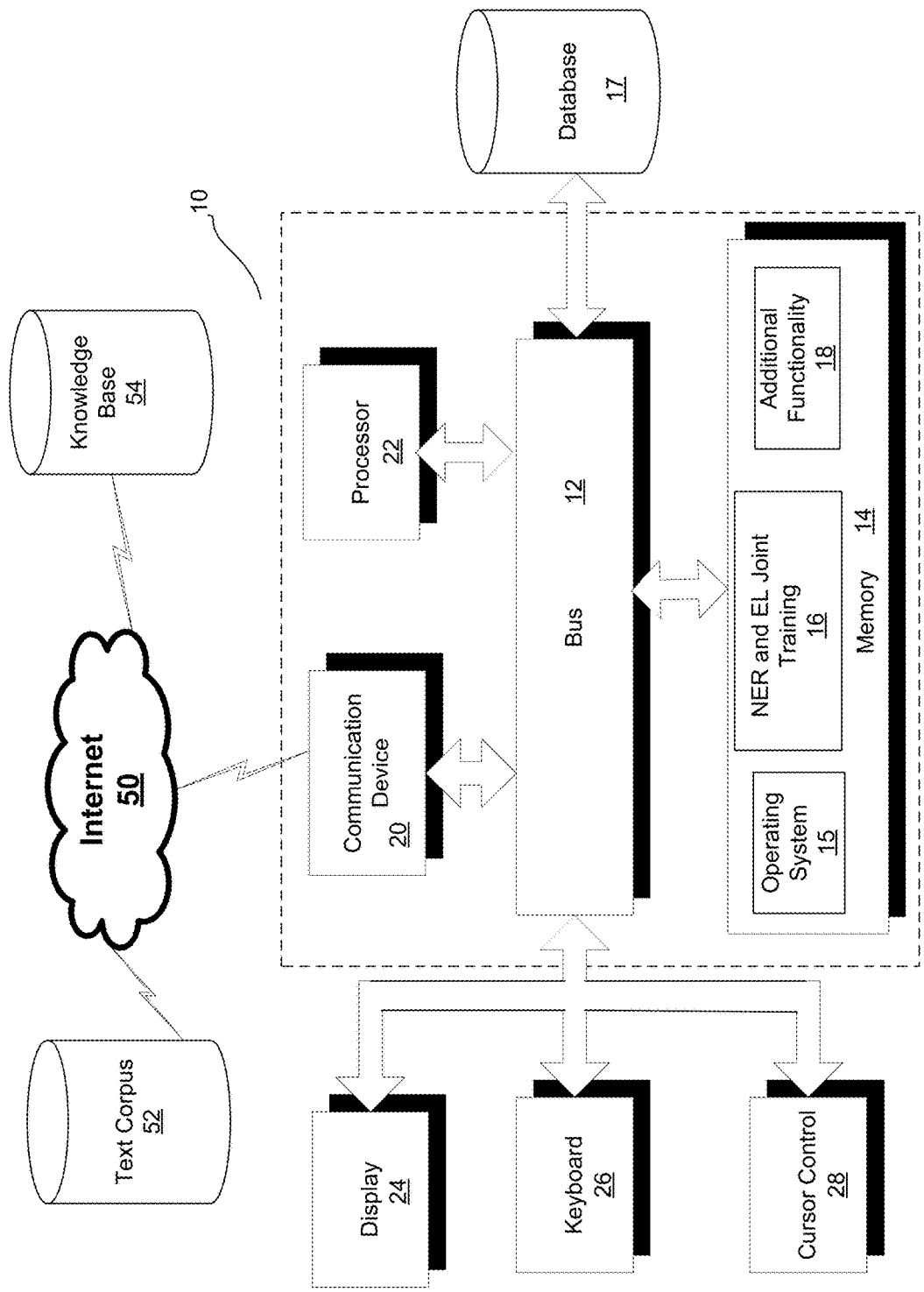
FIG. 1 is a block diagram of a computer server/system in accordance with an embodiment of the present invention.

FIG. 1 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media or storage device, transitory or non-transitory. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include an NER and EL Joint Training module 16 for joint NER and EL modeling and processing, and all other functionality disclosed herein. System 10 can be part of a larger system, such as a natural language processing ("NLP") system and additional functionality that uses the NLP, such as a query response system. Therefore, system 10 can include one or more additional functional modules 18 to include the additional functionality. A database 17 is coupled to bus 12 to provide centralized storage of data used by modules 16 and 18.

System 10, through communication device 20 and the Internet 50, or any other communications network, accesses a text corpus 52 and a knowledge base 54. Text corpus 52 can be structured or unstructured electronic text, such as twitter "tweets", and knowledge base 54 can be any public or private electronic source of knowledge, such as Wikipedia entries. Text corpus 52 and knowledge base 54 can also be local to system 10, such as through data stored in database 17.

NER and EL can be considered to be related tasks. For example, given the phrase "Michael Jordan played for the Chicago Bulls", a human language faculty would easily infer that "Michael Jordan" is a person. However, an automated system needs a source of world knowledge (e.g., Wikipedia) to infer that in this context, "Michael Jordan" refers to the basketball player and not the machine learning researcher, and further that "Chicago Bulls" is more likely to refer to the name of a basketball team than the location "Chicago, Ill." and the concept "bulls" separately.

Further, a growing interest in leveraging information contained in social media text such as tweets and YouTube comments—which are often noisy and pose problems for many NLP systems—has created a need for NER and EL systems that generalize well over new data containing unseen vocabulary terms and inconsistent orthographic forms. Carrying out NER and EL jointly, as with embodiments of the invention, can improve generalization by mitigating the effect of unreliable features.

Embodiments address the problem of identifying the set of entities (e.g., people, organizations, and locations) that are mentioned and discussed in a large corpus of text, such as a collection of "newswire" articles or Twitter tweets. The problem comprises two text analytic tasks NER and EL. NER, as described, is the task of automatically identifying mentions of entities in text; for example, recognizing that which noun-phrases are actually names of people, places and organizations. EL, as described, is the task of linking these extracted mentions to a specific entity in a knowledge base. Often, this involves disambiguating between multiple similar entities that the mention may refer to within a given context (e.g., should the mention "Washington" be linked to the Wikipedia page about the person, the state, or the U.S. Government?).

Most known approaches to using both NER and EL have focused on clean, formal text such as "newswire." Therefore, most existing approaches perform poorly (especially the recall of NER) when applied to social data such as Twitter. Current industrial solutions build two separate models, one for each of the tasks (NER and EL). Then, the models are run in a pipeline fashion in which errors from the first system (NER) cascade into the second system (EL). Some more advanced approaches therefore apply deterministic rules to mitigate some of these errors.

Entity linking typically succeeds entity recognition. However, the feedback from linking can help a system make better decisions about entity recognition. This is particularly important with social data, in which existing entity recognition systems have poor recall. For example, if a phrase in the text matches an entity in Wikipedia, it provides strong evidence that the phrase is an entity that should be extracted. Further, additional information from the linked page can help better predict the type of entity mention (e.g., person, location or organization).

Embodiments are directed to novel functionality in which the two problems are solved with a single unified probabilistic model. The prediction space of this new model is the cross product of the output spaces of the two tasks. Specifically, embodiments attempt to predict a set of tuples (i.e., one tuple per mentioned entity) in which each tuple includes a mention, an entity type, and a target entity. The model includes dependencies between the output variables of the two tasks that can then jointly be used to learn from data. Therefore, the prediction of one task can influence the prediction of the other, and vice versa. For example, in the joint model, evidence in the surrounding text allows the EL system to disambiguate "Washington"' and correctly link to the Wikipedia page for Washington State. Then, information on that Wikipedia page provides evidence for NER that the entity-type for "Washington" is therefore a "location" and not a "person."

In contrast to known approaches, embodiments perform full joint inference and learning in this model. Specifically, known approaches generally independently make predictions for individual components of the tuple, thus first predicting "Washington" is a mention, then incorrectly predicting the type as "person" then incorrectly linking to the page for "Washington" the founding father. Errors propagate because information only flows in one direction. Instead, embodiments make the prediction jointly by searching over the space of tuples and find the one that has the highest probability under the joint model. Further, embodiments are able to learn the model jointly by optimizing a rank-based maximum-margin objective function via stochastic gradient descent on a labeled training corpus.

Figure 2:
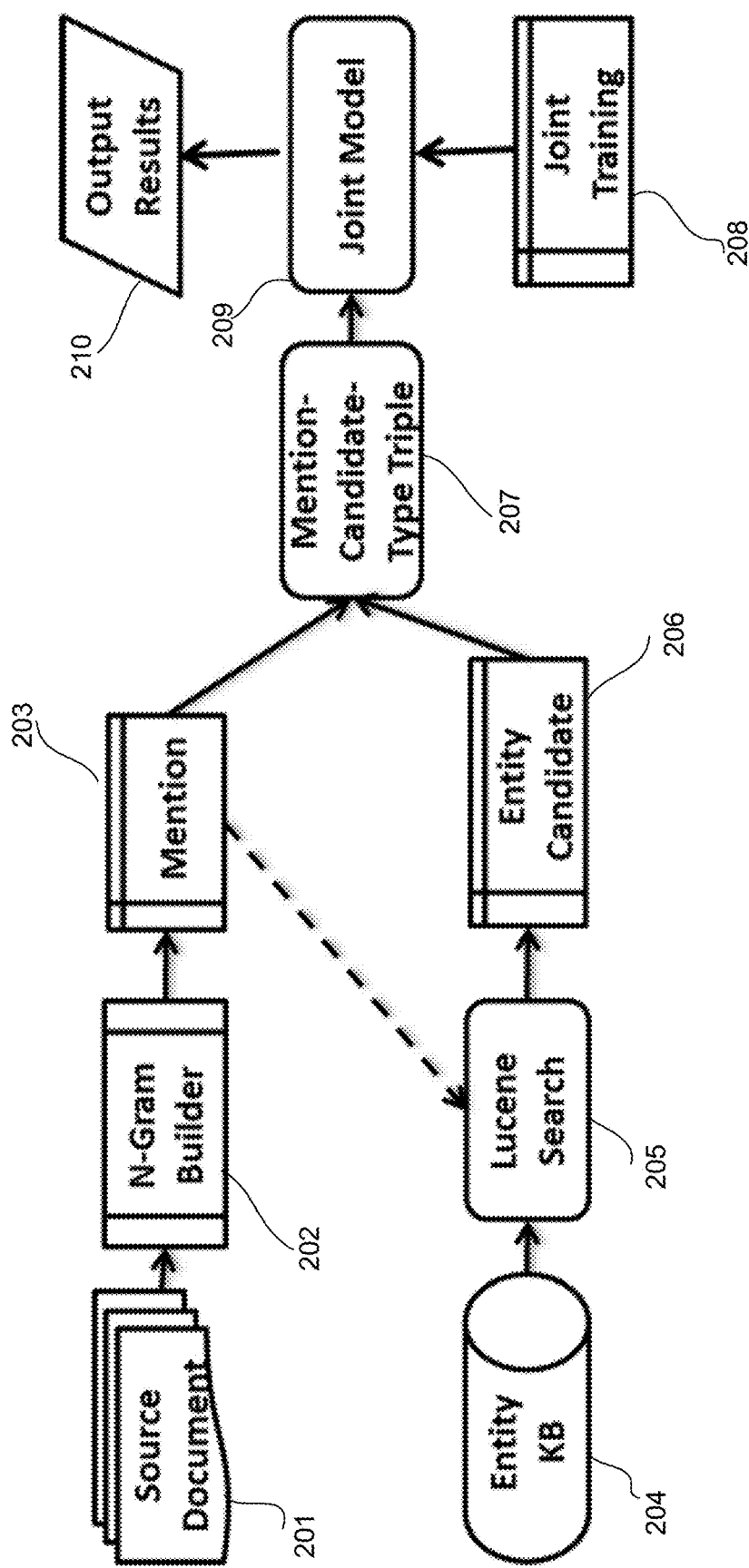
FIG. 2 is a flow diagram of the functionality of the system of FIG. 1 when implementing NER and EL joint training in accordance with an embodiment.

FIG. 2 is a flow diagram of the functionality of system 10 of FIG. 1 when implementing NER and EL joint training in accordance with an embodiment. In one embodiment, the functionality 200 of the flow diagram of FIG. 2 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

Source documents 201 (or a text corpus, such as text corpus 52 of FIG. 1) are provided as input to functionality 200 of FIG. 2. It is assumed that each input document of source documents 201 has a set of ground truth mentions $\{m_i\}$. Each mention $m_i$ has a ground truth type $t_i$, which is a member of some type ontology T such as PER, LOC, ORG. It is assumed that T contains the special type O indicating that the mention does not refer to a proper noun phrase. Each $m_i$ also has a ground truth entity $e_i$ corresponding to an entry in a knowledge base such as Wikipedia. It is assumed $e_i$ can take the value N/L, which indicates that the mention refers to an entity that is not a member of the KB (or that the mention is not a proper noun phrase).

A mention $m_i$ with $t_i$=O and $e_i$=N/L is not a proper noun phrase, whereas a mention with $t_i$=O and $e_i$=N/L is a proper noun phrase that is not a member of the KB. Further, the output of the NER/EL system (i.e., system 10 of FIG. 1 or functionality 200 of FIG. 2) for a given document is a set of predicted mentions, each with a predicted type and entity.

An entity KB 204 (or any type of knowledge base, such as knowledge base 54 of FIG. 1) is also provided as input to functionality 200 of FIG. 2.

An N-Gram Builder 202 generates a set of all document n-grams. An n-gram is a contiguous sequence of n items from a given sequence of text or speech. The items can be phonemes, syllables, letters, words or base pairs according to the application. N-Gram Builder 202 collects n-grams from the text corpus of source documents 201.

At 203, all document n-grams are treated as candidate mentions in one embodiment for system 10.

At 205, for each candidate mention, the system queries an information retrieval engine (e.g., a Lucene index) using the mention's surface form text to generate a set of candidate entities, $ê_i$, for the mention, and the top search results are taken as entity candidates at 206. In general, any type of information retrieval engine can be used that indexes entity KB 204 for easy retrieval. "Lucene" is an open-source information search retrieval software library that is used in one embodiment. However, in other embodiments, alternative search queries can be used. Further, in general, all entities in the KB can be considered as potential candidates for linking, and the top results from the information retrieval system are selected mainly for addressing scaling issues. In other embodiments, alternate methods can be can be used, if needed, to reduce the number of search results.

At 207, the search space is generated for a candidate mention $\{\hat{m}_i\}$ by taking the cross product between the set of candidate entities, $\hat{e}_i$, and the types in the type ontology, T. The type triple refers to (mention, type, entity).

The search space is then fed into a joint model 209 (i.e., the set of all triples across all training documents are input into the learning algorithm). Model 209, parameterized by weights θ, defines a probability distribution over all possible sets of candidate (mention, type, entity) tuples, S, conditioned on a document d. In one embodiment, model 209 can be expressed follows:

$$P(S \mid d) = \frac{1}{Z} \exp(\theta \cdot G(d, S)) \quad (1)$$

where Z is a normalizing constant given by:

$$Z = \sum_{S'} \exp(\theta \cdot G(d, S'))$$

and G(d, S) can be rewritten as:

$$G(d, S) = \sum_{(m,t,e) \in S} \exp(\theta \cdot g(d, m, t, e))$$

where the function g(d, m, t, e) maps a (mention, type, entity) tuple to some high-dimensional feature space. (m, t, e) tuples are referred to below as "s".

Model 209 further receives, as input, joint training 208 which is the result of joint training disclosed below. Model 209 then outputs results 210 which are, for a given document, a set of predicted mentions, each with a predicted type and entity. For example, one output tuple could be: (Washington, LOCATION, https://en.wikipedia.org/wiki/Washington_state).

In one embodiment, joint model 209, given a document d, includes an inference procedure with a goal of predicting a set of non-overlapping (mention, type, entity) tuples, Ŝ. As described above, the search space for a candidate mention $\hat{m}_i$ is the cross product between the candidate entities for the mention, $\hat{e}_i$, and the type ontology T, and the search space for the entire document is the concatenation of all such mentions and search spaces.

For the inference procedure in accordance with one embodiment, let $L_i$ be a random variable such that $L_i$=1 if the candidate (mention, type, entity) tuple, $s_i$, is correct for d (and 0 otherwise). Then the following scoring function can be defined:

$$f_\theta(d, s_i) = P(L_i \mid d, s_i; \theta)$$

Which can be rewritten as the following:

$$f_\theta(d, s_i) = \frac{\exp(\theta \cdot g(d, s_i))}{\exp(\theta \cdot g(d, s_i)) + (1 - \exp(\theta \cdot g(d, s_i)))} \quad (2)$$

In one embodiment, in the inference procedure, if $f_\theta(d, s_i)$>T (where T is a hyperparameter) then $s_i$ is included in the prediction for d.

One embodiment performs parameter estimation for joint model 209. Given a set of training documents, the goal is to learn optimal model parameters θ* such that joint model 209 can jointly predict correct segments, types, and linkings.

One embodiment formulates the learning procedure as a ranking problem. Let Ŝ be the entire search space for a document d and let S be the ground truth set of (mention, type, entity) tuples for the d. The objective is to learn model parameters such that the prediction, Ŝ, is ranked lower than the ground truth by a margin of no more than ϵ(a hyperparameter). The loss function is defined as follows:

$$L(\theta) = F_\theta(d, S) - F_\theta(d, \hat{S}) \quad (3)$$

where:

$$F_\theta(d, S) = \sum_{s_i \in S} f_\theta(d, s_i)$$

The parameter estimation procedure is as follows:

```
input: document d, hyperparameter ϵ
while not converged do
 | Ŝ = inference(d);
 | if F_θ(S) − F_θ(Ŝ) < ϵ then
 | | update weights θ;
 | end
end
```

The weights are updated using stochastic gradient descent in one embodiment.

In one embodiment, for each candidate (mention, type, entity) tuple, four broad categories of features are extracted: (1) mention features; (2) link features; (3) type features; and (4) joint features.

Mention features are designed to capture the likelihood that a given token span corresponds to a proper noun phrase. These include surface form features such as capitalization pattern, whether or not the span contains punctuation, and span length. Embodiments also include the mention's link probability equal to the count of times the span appears in Wikipedia in the anchor text of link to a Wikipedia entity divided by the number of times the span appears in Wikipedia overall.

Given a token span and a candidate KB entity, link features are designed to capture the likelihood that the candidate entity is a valid link for the span. These features consist of several measures of string similarity between the span and the entity's Wikipedia page, including:

Exact match between the span and the entity candidate's Wikipedia page title, as well as exact match between normalized versions of both, where both are converted to lowercase and punctuation is removed;

String edit distance and cosine similarity between the span and the entity candidate's Wikipedia page title; and String edit distance and cosine similarity between the span's context and the first paragraph of the entity candidate's Wikipedia page The entity probability of the KB candidate, or the number of times the candidate was linked to in Wikipedia, is also used in one embodiment, as well as the conditional link probability of the mention given the KB candidate, the number of times a given mention appeared in anchor text linking to the candidate entity's Wikipedia page divided by the number of times a mention appeared in anchor text overall.

Type features capture the likelihood that a token span refers to a named entity belonging to a particular type class.

For example, the token span "Boston" is likely to refer to the capital city of Massachusetts, a location. Each span is matched against a set of 31 gazetteers (i.e., a geographical dictionary or directory used in conjunction with a map or atlas), which includes lists of names, geographic locations, and companies. In addition, prior to feature extraction, the data is processed with a conditional random field ("CRF") trained on similar text documents and is added to its entity type prediction for the span as a feature in one embodiment.

Joint features capture correlations between entity types and KB entries. For each candidate entity, keywords are extracted from the infobox of the corresponding Wikipedia page, if one exists. The intuition behind this feature is that infoboxes often contain type information. For example, the infobox for The New York Times contains many words evocative of an organization such as "Owner(s)", "Founder(s)", "Company", whereas the infobox for New York contains words associated with location's like "Capital", "Largest city", "State song(s)".

In addition, embodiments group the gazetteers mentioned above into types, then match the title of the candidate entity against them and add as a feature the type that had the most hits. Finally, embodiments include "type cross entity" features such as [KB entity contains a date-of-birth field AND type=person], which allow information to be shared across the two tasks. Table 1 summarizes the features used one embodiment.

TABLE 1

| | Features |
|---|---|
| Mention | capitalization pattern, span length, span-contains-punctuation, lemmatized span string, span first word, span previous word, span next word, link probability |
| Link | exact string match, string edit distance, cosine sim, context edit distance, context cosine sim, entity probability, conditional link probability |
| Type | gazetteer matches, CRF prediction |
| Joint | infobox, lexicon category, type cross entity |

Historically, joint models have been difficult to apply in other text analytic domains, often resulting in only modest improvements in accuracy. There are two primary reasons for this: (1) previous attempts have focused on datasets for which accuracy is already high and are thus unlikely to have an impact; and (2) joint models render exact inference and learning intractable because the joint output space is exponentially large and not suitable for dynamic programming. In the problem space of social media text, accuracy of the current state-of-the-art is already low, thus providing more potential for improvement via a joint model. Further, employing stochastic gradient descent in the context of approximate inference and a rank-based objective as with embodiments of the present invention help overcome the intractable nature of the joint models. One final challenge addressed by embodiments of the invention in training joint models is that the objective function balances the signals from the two subtasks appropriately.

Embodiments significantly reduce errors, especially in recall. For example, results show that the joint modeling in accordance to embodiments improves the recall from 57.78 (CRF trained on Twitter data) to 65.56 (joint model with parameter averaging).

Figure 3:
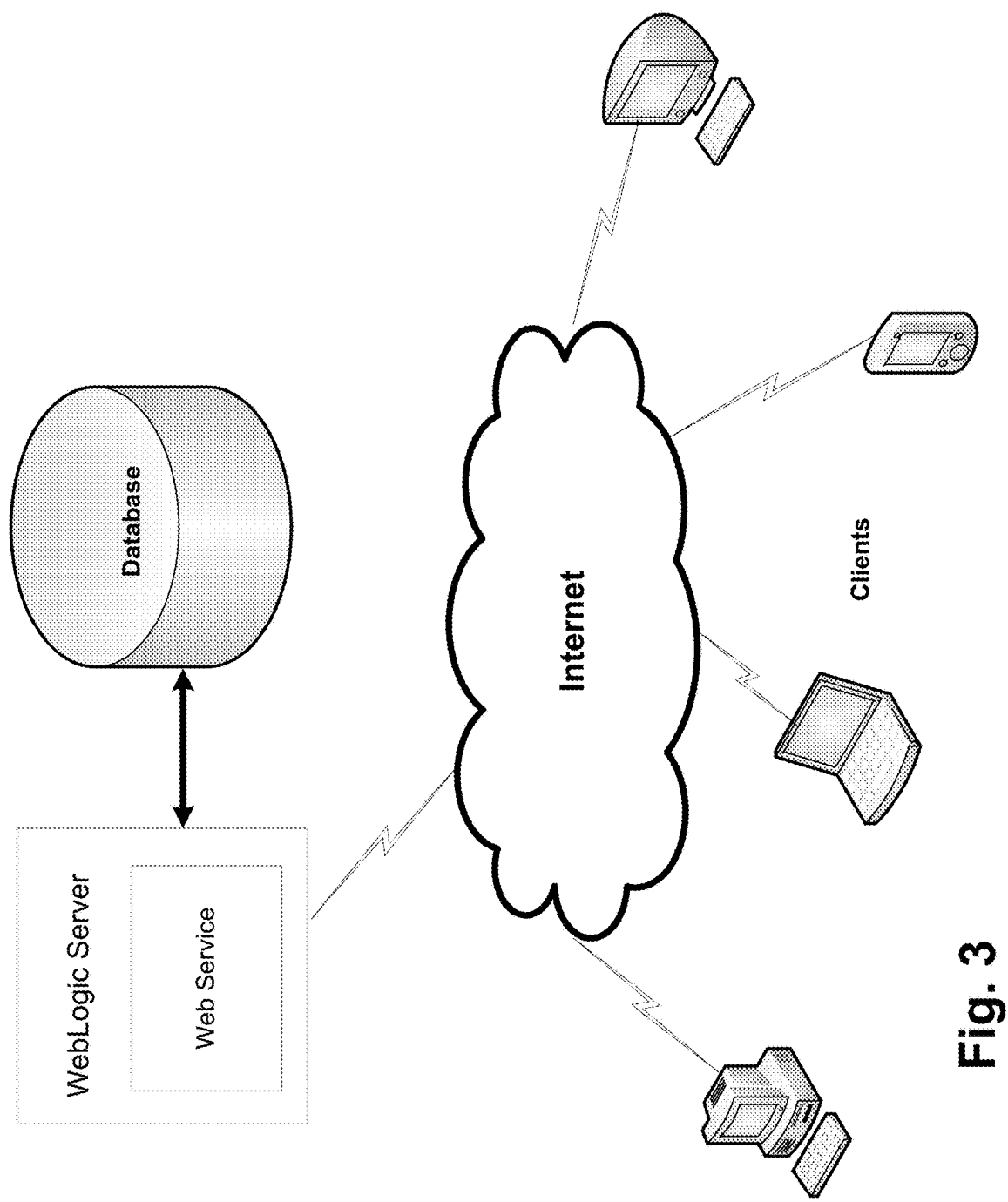
FIG. 3 is a block diagram that illustrates a plurality of clients that access a web service in accordance with one embodiment.

FIG. 3 is a block diagram that illustrates a plurality of clients that access a web service (i.e., an NER and EL Joint Training module 16 of FIG. 1) that is implemented on a WebLogic Server from Oracle Corp. in one embodiment. In other embodiments, other implementations of a web service can be used.

As disclosed, embodiments implement a joint training model that utilizes both NER and EL in a feedback type arrangement to improve the model and to improve the overall prediction.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of natural language processing comprising:
receiving a text corpus comprising a plurality of documents, wherein each document comprises a set of ground truth mentions, and each mention comprises a type of a plurality of types in a type ontology;
receiving a knowledge base;
generating a set of document n-grams from the text corpus and considering all n-grams as candidate mentions;
for each candidate mention, querying the knowledge base and in response retrieving results and generating a set of candidate entities for the candidate mention;
from the results retrieved by the queries, generating a set of candidate entities for the candidate mention;
generating, for each candidate mention, a search space by taking a cross-product between the set of candidate entities and the plurality of types in the type ontology; and
generating a joint model from the generated search spaces.

2. The method of claim 1, further comprising:
joint training the joint model; and
outputting, from the joint model, for a given document, a set of predicted mentions.

3. The method of claim 2, wherein each of the predicted mentions of the set comprises a predicted type and entity.

4. The method of claim 1, wherein the retrieved results are limited to a subset of all retrieved documents from the knowledge base.

5. The method of claim 2, wherein the joint model comprises an inference procedure that predicts a set of non-overlapping candidate tuples.

6. The method of claim 5, wherein each candidate tuple comprises (mention, type, entity), further comprising extracting mention features, link features, type features, and joint features.

7. The method of claim 2, further comprising performing parameter estimation for the joint model.

8. A non-transitory computer-readable medium having instructions stored thereon that, when executed by a processor, cause the processor to perform natural language processing, the natural language processing comprising:
receiving a text corpus comprising a plurality of documents, wherein each document comprises a set of ground truth mentions, and each mention comprises a type of a plurality of types in a type ontology;
receiving a knowledge base;
generating a set of document n-grams from the text corpus and considering all n-grams as candidate mentions;

for each candidate mention, querying the knowledge base and in response retrieving results and generating a set of candidate entities for the candidate mention;

from the results retrieved by the queries, generating a set of candidate entities for the candidate mention;

generating, for each candidate mention, a search space by taking a cross-product between the set of candidate entities and the plurality of types in the type ontology; and generating a joint model from the generated search spaces.

9. The computer-readable medium of claim 8, the natural language processing further comprising:

joint training the joint model; and outputting, from the joint model, for a given document, a set of predicted mentions.

10. The computer-readable medium of claim 9, wherein each of the predicted mentions of the set comprises a predicted type and entity.

11. The computer-readable medium of claim 8, wherein the retrieved results are limited to a subset of all retrieved documents from the knowledge base.

12. The computer-readable medium of claim 9, wherein the joint model comprises an inference procedure that predicts a set of non-overlapping candidate tuples.

13. The computer-readable medium of claim 12, wherein each candidate tuple comprises (mention, type, entity), further comprising extracting mention features, link features, type features, and joint features.

14. The computer-readable medium of claim 9, the natural language processing further comprising further comprising performing parameter estimation for the joint model.

15. A natural language processing system comprising:

a processor;

a storage device coupled to the processor that stores instructions executed by the processor that causes the processor, in response to having access to a text corpus comprising a plurality of documents and a knowledge base, wherein each document comprises a set of ground truth mentions, and each mention comprises a type of a plurality of types in a type ontology, to:

generate a set of document n-grams from the text corpus and considering all n-grams as candidate mentions;

for each candidate mention, query the knowledge base and in response retrieving results and generating a set of candidate entities for the candidate mention;

from the results retrieved by the queries, generate a set of candidate entities for the candidate mention;

generate, for each candidate mention, a search space by taking a cross-product between the set of candidate entities and the plurality of types in the type ontology; and generate a joint model from the generated search spaces.

16. The system of claim 15, the processor further:

joint training the joint model; and outputting, from the joint model, for a given document, a set of predicted mentions.

17. The system of claim 16, wherein each of the predicted mentions of the set comprises a predicted type and entity.

18. The system of claim 16, wherein the joint model comprises an inference procedure that predicts a set of non-overlapping candidate tuples.

19. The system of claim 18, wherein each candidate tuple comprises (mention, type, entity), further comprising extracting mention features, link features, type features, and joint features.

20. The system of claim 15, the processor further performing parameter estimation for the joint model.

* * * * *

UNITED STATES PATENT AND TRADEMARK OFFICE
CERTIFICATE OF CORRECTION

PATENT NO. : 10,410,139 B2  Page 1 of 1
APPLICATION NO. : 15/168309
DATED : September 10, 2019
INVENTOR(S) : Kanani et al.

It is certified that error appears in the above-identified patent and that said Letters Patent is hereby corrected as shown below:

On the Title Page

Column 2, under Other Publications, Line 1, delete "Entitye" and insert -- Entity --, therefor.

On page 2, Column 1, under Other Publications, Line 8, delete "Workshp" and insert -- Workshop --, therefor.

In the Specification

In Column 4, Line 36, delete "N/L," and insert -- NIL, --, therefor.

In Column 4, Line 39, delete "$e_i$=N/L" and insert -- $e_i$=NIL --, therefor.

In Column 4, Line 40, delete "$e_i$=N/L" and insert -- $e_i$=NIL --, therefor.

In Column 6, Line 17, after "$\Sigma_{s_i \in S} f_\theta(d, s_i)$" insert -- . --.

In the Claims

In Column 9, Line 35, in Claim 14, after "comprising" delete "further comprising".

Signed and Sealed this
Twenty-fifth Day of August, 2020

Andrei Iancu
*Director of the United States Patent and Trademark Office*